United States Patent
Barefield et al.

(10) Patent No.: US 8,048,357 B2
(45) Date of Patent: Nov. 1, 2011

(54) RESIN INFUSION POTTING

(76) Inventors: Kevin J. Barefield, Opelika, AL (US); Richard Campbell, Tallahassee, FL (US)

(*) Notice: Subject to any disclaimer, the term of this patent is extended or adjusted under 35 U.S.C. 154(b) by 92 days.

(21) Appl. No.: 12/378,505

(22) Filed: Feb. 17, 2009

(65) Prior Publication Data

US 2009/0189308 A1 Jul. 30, 2009

Related U.S. Application Data

(63) Continuation-in-part of application No. 10/734,564, filed on Dec. 8, 2003, now abandoned.

(51) Int. Cl.
*B29C 45/14* (2006.01)

(52) U.S. Cl. ......... 264/261; 264/263; 264/273; 264/102

(58) Field of Classification Search ................ None
See application file for complete search history.

(56) References Cited

U.S. PATENT DOCUMENTS

| | | | | |
|---|---|---|---|---|
| 2,177,567 A * | 10/1939 | Imbault | ............ | 164/100 |
| 2,604,362 A * | 7/1952 | Sugerman et al. | ............ | 300/21 |
| 3,264,017 A * | 8/1966 | Lagarde | ............ | 403/302 |
| 3,570,074 A * | 3/1971 | Schimmeyer et al. | ............ | 3/267 |
| 3,588,966 A * | 6/1971 | Thompson et al. | ............ | 403/265 |
| 3,653,098 A * | 4/1972 | Lagarde et al. | ............ | 24/114.5 |
| 3,672,712 A * | 6/1972 | Davis | ............ | 403/268 |
| 4,068,963 A * | 1/1978 | Brandestini | ............ | 403/268 |
| 5,132,069 A * | 7/1992 | Newton | ............ | 264/257 |
| 5,611,636 A * | 3/1997 | Flory | ............ | 403/269 |
| 7,076,853 B2 * | 7/2006 | Campbell | ............ | 29/458 |
| 2004/0093714 A1 * | 5/2004 | Campbell | ............ | 29/527.1 |

* cited by examiner

*Primary Examiner* — Edmund H. Lee
(74) *Attorney, Agent, or Firm* — J. Wiley Horton

(57) ABSTRACT

A process for forcibly infusing liquid potting compound into the exposed strands of a cable prior to forming a termination. The process uses a mold that encloses the exposed strands. Potting compound is then pumped into the mold, where it runs around and through the exposed strands. A second venting passage is preferably employed, so that the liquid potting compound flows through the mold without trapping any air pockets.

21 Claims, 17 Drawing Sheets

RESIN INFUSION POTTING

CROSS-REFERENCES TO RELATED APPLICATION

This application is a continuation-in-part of U.S. patent application Ser. No. 10/734,564, which was filed on Dec. 8, 2003, now abandoned. Pursuant to the provisions of 37 C.F.R. §1.304, the parent application remained pending as of the time of the filing of this continuation-in-part.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

1. Field of the Invention

This invention relates to the field of cables and ropes. More specifically, the invention comprises a process for thoroughly infusing liquid potting compound into the strands of a rope or cable prior to affixing an anchor or for other uses.

2. Description of the Related Art

Devices for mounting a termination on the end of a rope or cable are disclosed in detail in copending U.S. Application Ser. No. 60/404,973 to Campbell, which is incorporated herein by reference. Throughout this disclosure, the term "strand" will be used to describe the constituents of synthetic cables, natural-fiber cables, and ropes. Although synthetic cables are used for the illustrations, the reader should understand that the methods and devices disclosed are equally applicable to any type of stranded cable.

It is often useful to affix a piece of hardware to the end of a cable. Examples of hardware would be threaded fasteners, hooks, and eyes. Such hardware will be generically referred to as an "anchor." Anchors typically have an expanding internal passage or some type of interlocking features, such as ridges. The strands proximate the end of a cable are wetted with liquid potting compound. The wetted strands are then placed within the internal passage of the anchor. The potting compound then hardens to form a solid, thereby locking a length of strands into the anchor. The anchor, along with the contained strands and solid potting compound will be referred to as a "termination."

Those skilled in the art will know that the term "potting compound" generally refers to any liquid which can be transformed into a solid (such as by air-drying, cooling, reacting with a catalyst, etc.). Examples include thermoplastics, molten metals, thermosets, and reactive compounds (such as two-part epoxies).

Two methods of infusing liquid potting compound into the strands of a cable are in common use. These are: (1) Pulling an anchor into its final position around the exposed strands and pouring the liquid potting compound into an open end of the anchor; or (2) Infusing the exposed strands with liquid potting compound, then pulling the anchor into its final position (The infusion is typically accomplished via painting on the liquid potting compound or dipping the exposed strands into a vat of liquid potting compound).

Under either approach, the potting compound may fail to fully infuse the strands. Moreover, both approaches must generally be performed manually, resulting in drastic variations from termination to termination.

FIG. 1 shows four cables 10 with exposed strands in varying configurations. The far left example shows core strands 12 exposed and ready for potting in an undisturbed state. Proceeding to the right, the next example shows the exposed strands being compressed to form fanned strands 14. The next example shows the exposed strands being splayed to form conical strands 16. The far right example shows the strands being splayed apart further to form radially fanned strands 44. All these examples, as well as others, may be employed prior to infusing the exposed strands with liquid potting resin.

BRIEF SUMMARY OF THE PRESENT INVENTION

The present invention comprises a process for forcibly infusing liquid potting compound into the exposed strands of a cable prior to forming a termination. The process uses a mold that encloses the exposed strands. Potting compound is then pumped into the mold, where it runs around and through the exposed strands. A second venting passage is preferably employed, so that the liquid potting compound flows through the mold without trapping any air pockets. A portion of the mold is preferably an anchor that is to be attached to an end of the cable. The liquid potting compound is allowed to harden while the anchor remains in place, thereby locking the anchor to the end of the cable.

Figure 1:
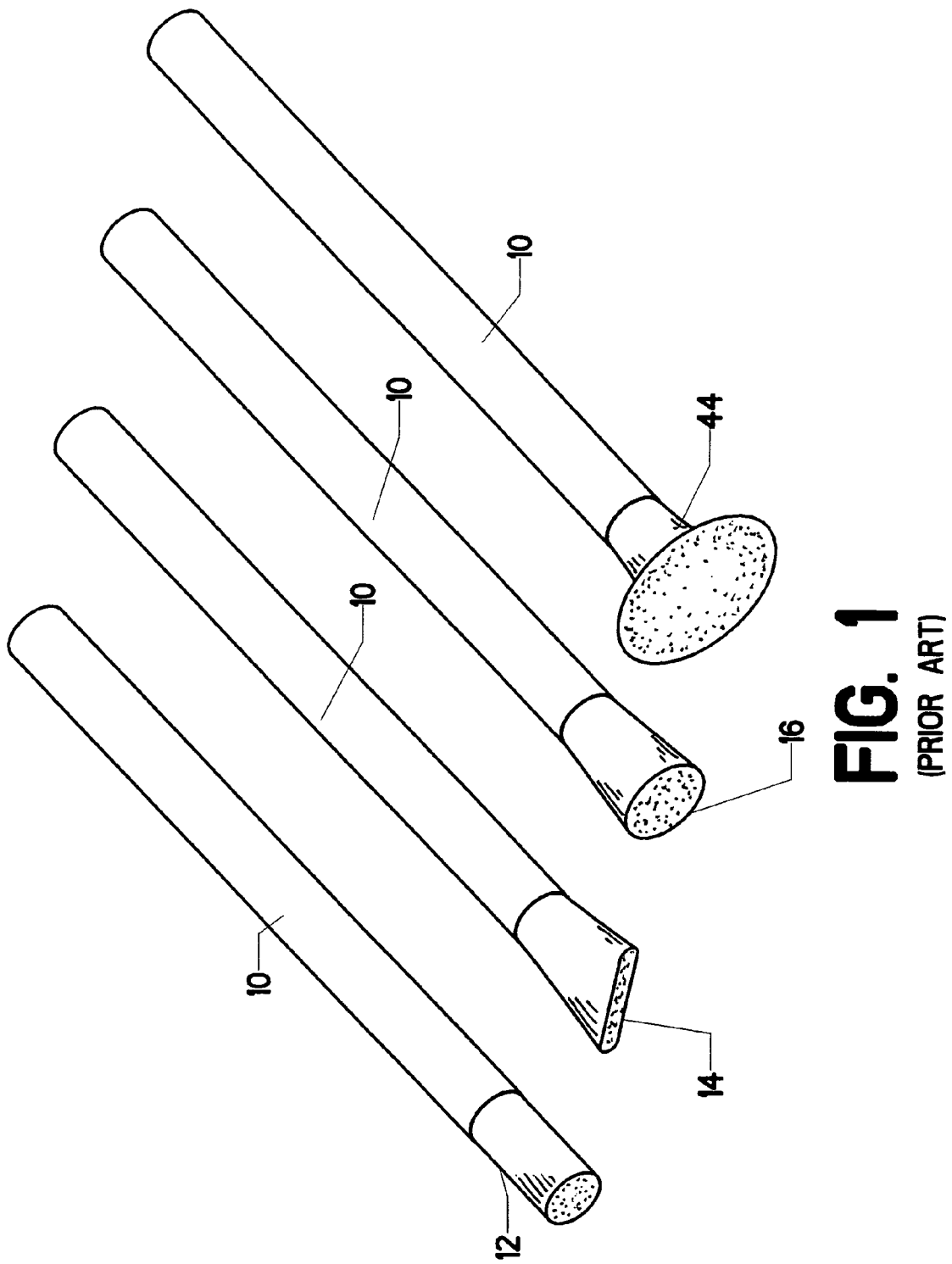
FIG. 1 is an isometric view, showing various cable strand configurations.

REFERENCE NUMERALS IN THE DRAWINGS 10 cable
12 core strands 14 fanned strands
16 conical strands
18 anchor
20 upper mold portion
22 mold base
24 strand cavity
26 separator
28 cable cavity
30 strand cavity
32 infeed runner
34 liquid coupling
36 liquid vent
38 vent coupling
40 infused strands
42 anchor fork
44 radially fanned strands
46 injector
48 needle
50 injection orifice
52 vent
54 dry strands
58 anchor end sealing surface
60 anchor holding fixture
62 cable holding fixture
67 anchor neck sealing surface
66 fixture sealing surface
68 anchor chamfer
70 fixture chamfer
72 O-ring
74 injector sealing surface
76 open end
78 neck end

DETAILED DESCRIPTION OF THE INVENTION

Figure 2:
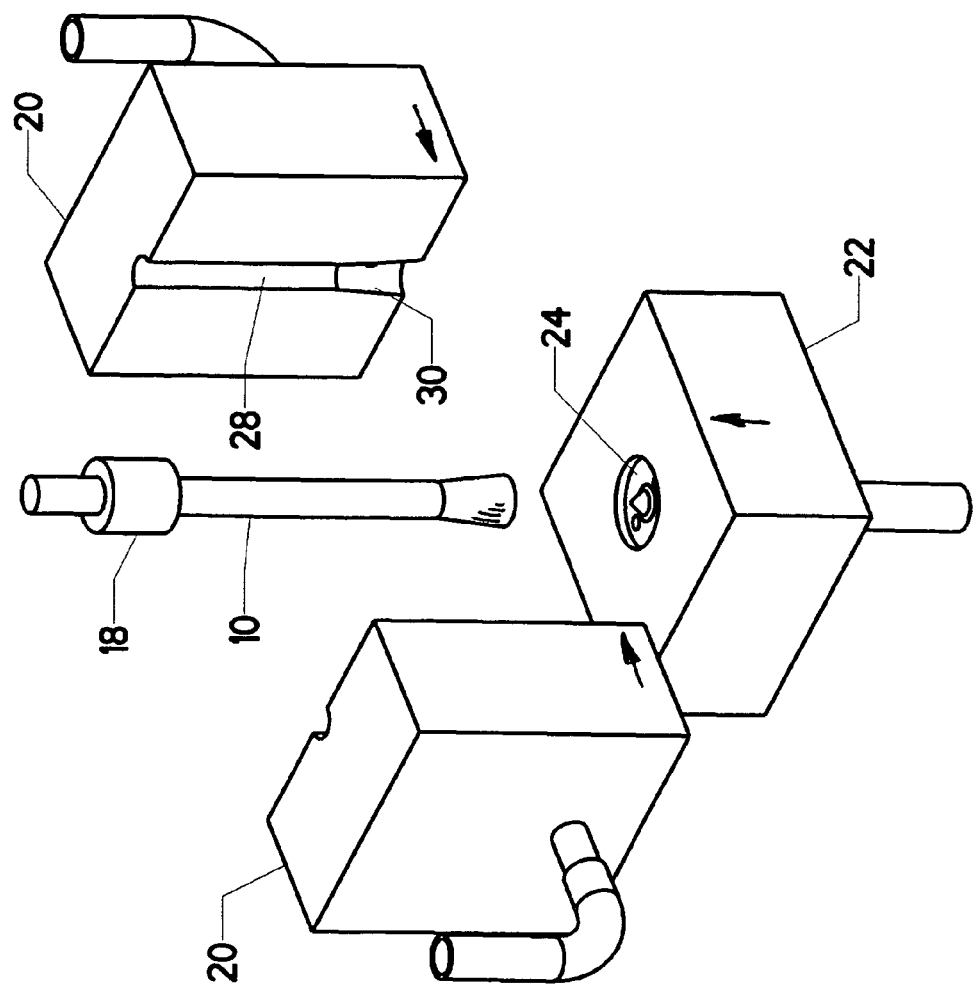
FIG. 2 is an isometric view, showing the operation of a mold.

FIG. 2 shows one embodiment of the present invention. Anchor 18 is placed on cable 10 and pulled away from the exposed end strands to the position shown. Cable 10 is then positioned between the upper mold portions 20 (In the example shown, two mold portions are used. The upper portion of the mold can also be split into three or more portions). Each upper mold portion 20 preferably includes a cable cavity 28 and a strand cavity 30. Mold base 22 lies beneath cable 10. The two upper mold portions 20 clamp securely together, as indicated by the arrows. This action results in cable 10 being held tightly within the internal passages in the two upper mold portions.

Mold base 22 then moves upward to seal off the bottom of cable 10. Those skilled in the art will realize that the type of mold shown is but one among many. The mold could split in other ways, move together in different ways, etc.

Figure 3:
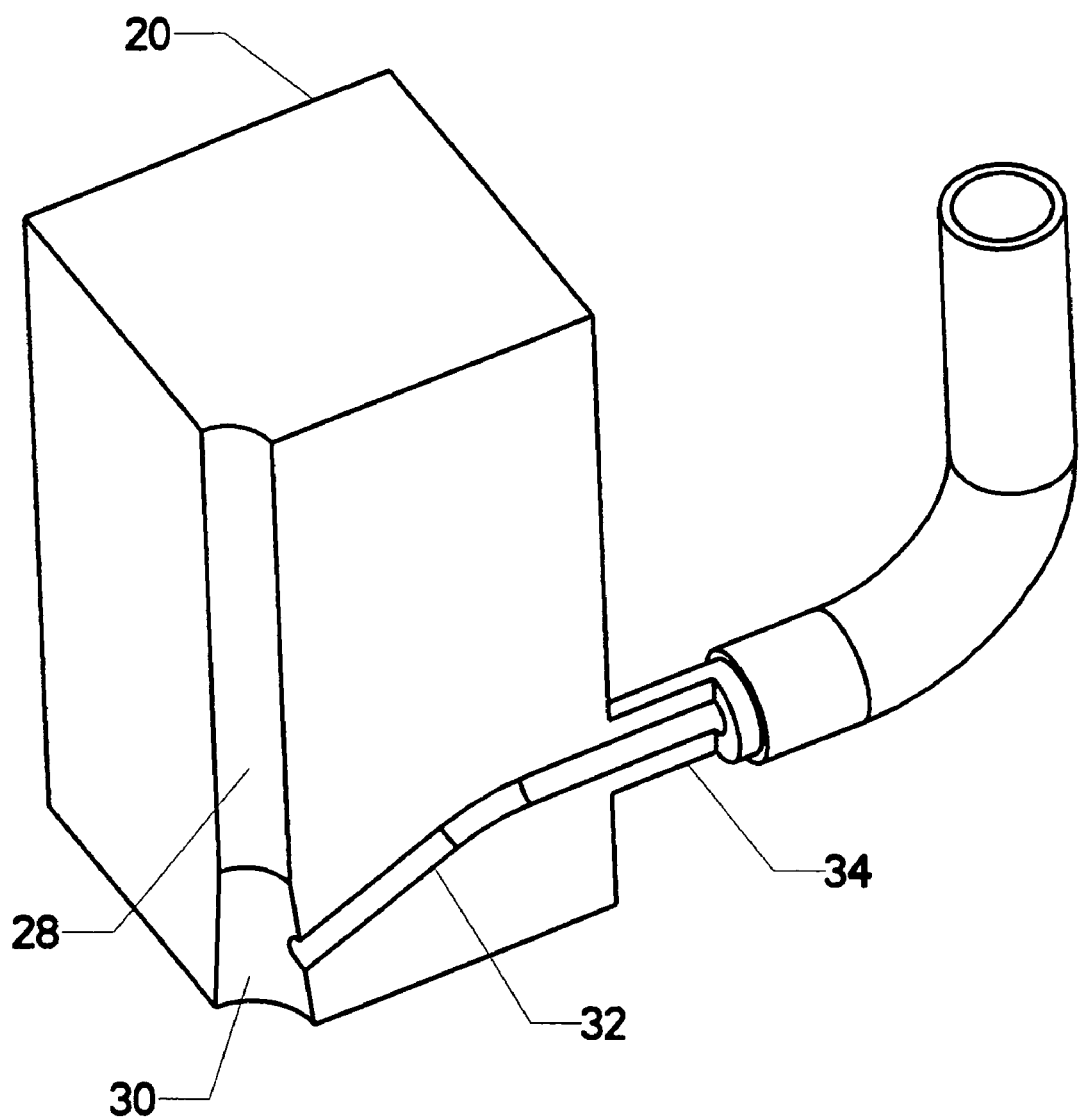
FIG. 3 is an isometric view, showing internal passages within the mold.

Once the mold closes, cable 10 is held securely within the internal passages. FIG. 3 is a sectional view of one of the two upper mold portions 20. The reader will observe that infeed runner 32 connects liquid coupling 34 with strand cavity 30. When clamped in place, preferably pressurized liquid potting compound is forced through infeed runner 32 where it emerges in and around the exposed strands of cable 10. Cable cavity 28 is clamped securely around the rest of cable 10, thereby preventing the liquid potting compound from diffusing upward beyond the exposed end strands. As an alternative, a fairly loose fit can be provided around cable 10 so that entrapped air can vent past cable 10. The second upper molding portion can be equipped with a corresponding infeed runner. Additional infeed runners could also be provided in the mold base. An infeed runner could be placed at virtually any location and in any orientation within strand cavity 30.

Figure 4:
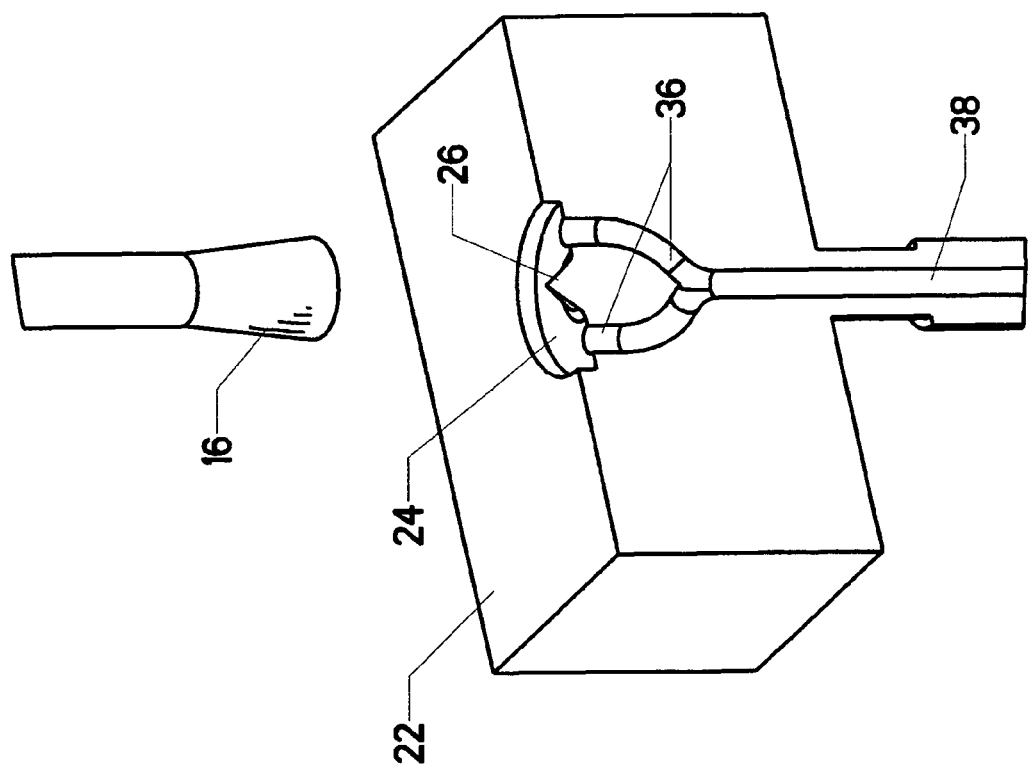
FIG. 4 is an isometric section view, showing the mold base.

FIG. 4 is an isometric section view of mold base 22. Its upper surface opens into strand cavity 24 (A flat upper surface having no recess can also be used). A conically shaped separator 26 may be provided in the middle in order to splay the exposed strands of the cable when mold base 22 is moved up into position. Mold base 22 is preferably equipped with one or more liquid vents 36. These connect to vent coupling 38. In operation, the mold parts are clamped together to form the enclosed strand cavity 30. Liquid potting compound is then forced under pressure into the mold through infeed runners 32. Liquid vents 36 allow air within the mold cavity to escape. Eventually, liquid potting compound completely fills the cavity and flows out through liquid vents 36. A vacuum may be applied to vent coupling 38 in order to promote faster flow or more complete liquid potting compound infusion.

As an alternative, the infeed runners and liquid vents can be reversed so that the liquid potting compound flows from the bottom to the top, Vacuum and pressure can also be used interchangeably to create the desired flow. Although the runners and vents have been shown as circular, those skilled in the art will know that they could also be made with an oval cross section, a square cross section, or any other desired shape.

Figure 5:
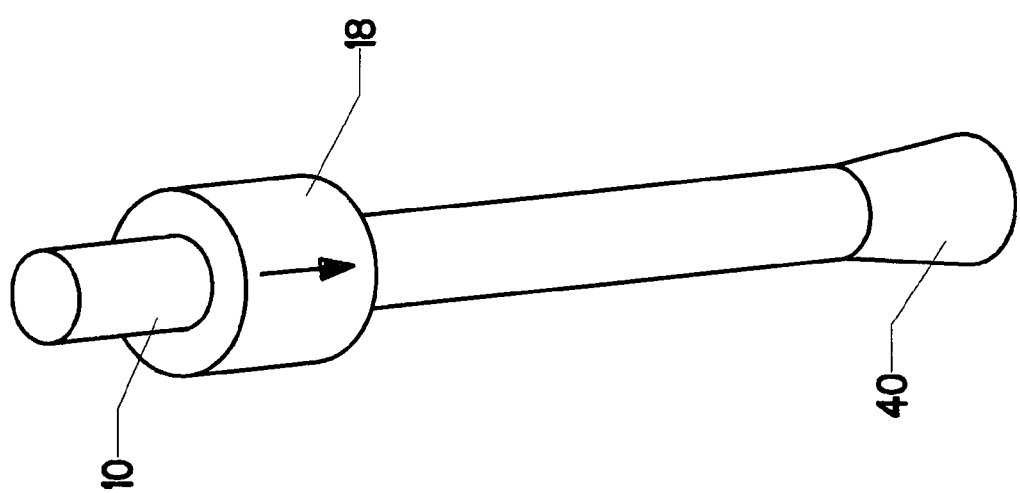
FIG. 5 is an isometric view, showing the installation of an anchor.
Figure 6:
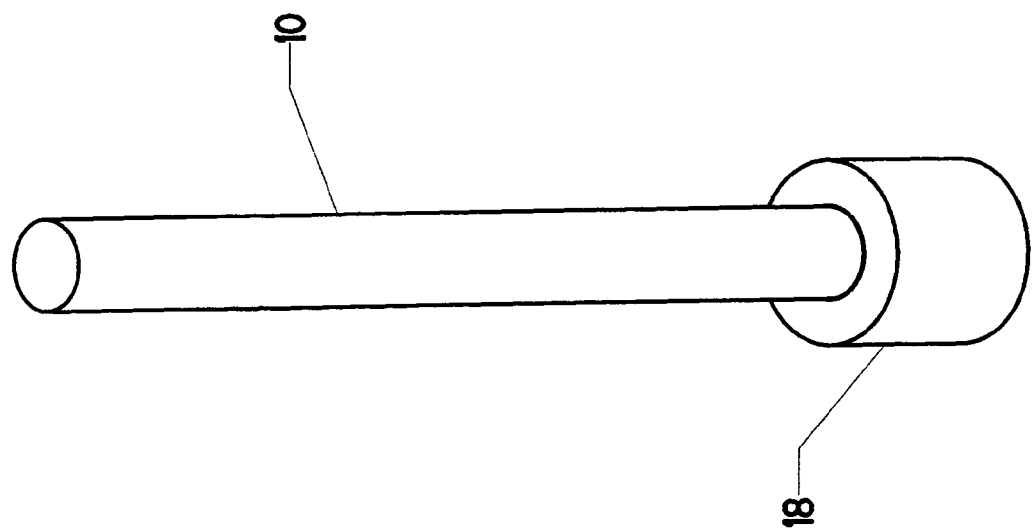
FIG. 6 is an isometric view, showing the installation of an anchor.

FIG. 5 shows cable 10 after its end strands have been infused with liquid potting compound within the mold. The end strands are now denoted as infused strands 40. Anchor 18 is then moved down in the direction shown until it encloses the infused end strands (or otherwise mechanically interlocks). Anchor 18 is shown in its final position in FIG. 6. It remains in this position while the liquid potting compound hardens into a solid, thereby forming a completed termination. As an alternative, anchor 18 can be slid into position from the opposite end of the cable after the liquid potting compound is applied.

Figure 7:
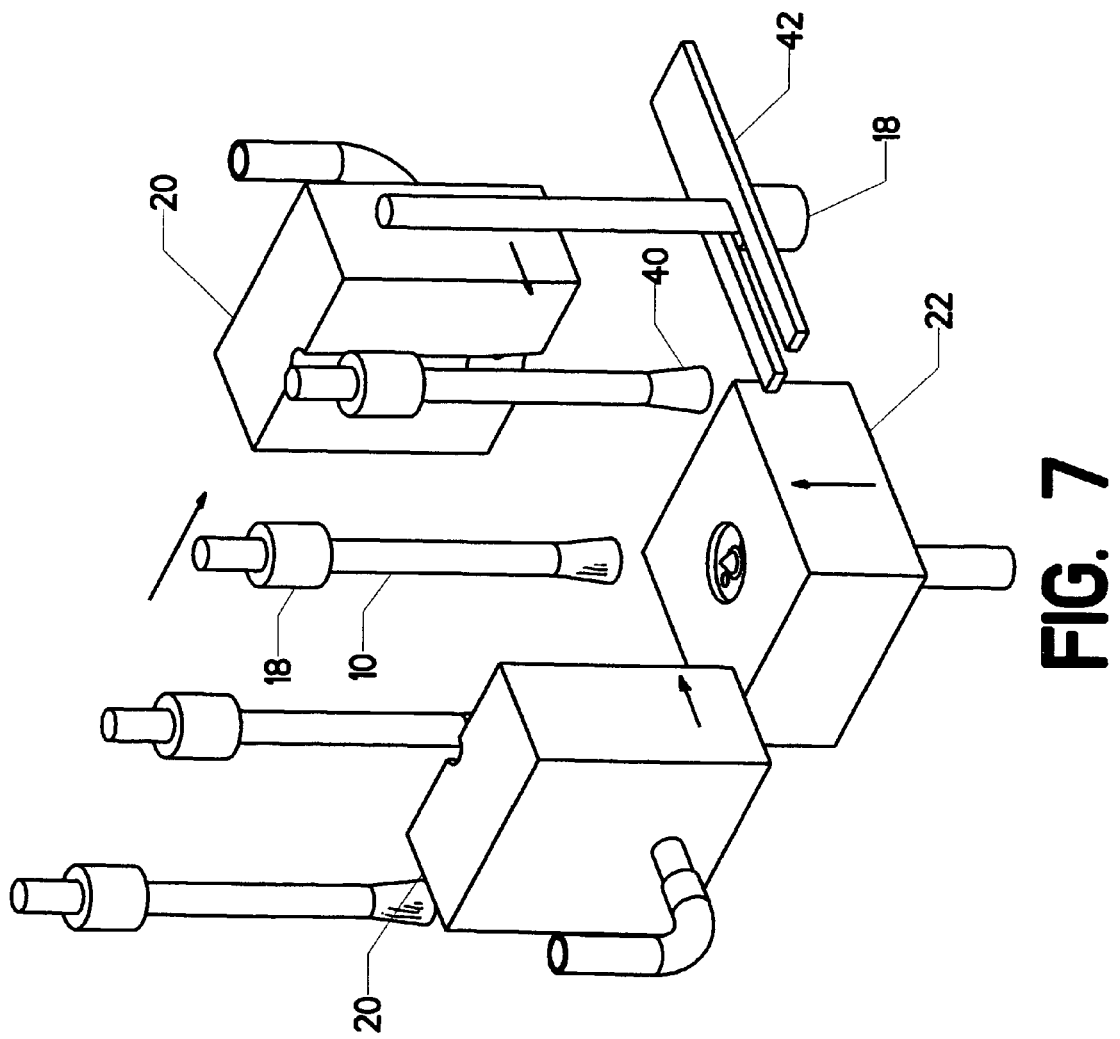
FIG. 7 is an isometric view, showing the mold on an assembly line.

FIG. 7 shows the application of the devices and processes disclosed to an assembly line. A series of cables 10—with anchors 18 in an appropriate position, are sequentially fed along the line in the direction indicated by the arrow. The middle cable 10 is set to be clamped within the mold components. Its exposed end strands will then be infused with liquid potting compound. The cable 10 immediately to the right of the middle cable 10 has just exited the mold. Its end strands have been infused with liquid potting compound. They are thus denoted as infused strands 40.

As cable 10 moves further down the line, anchor fork 42 (or other suitable devices, whether automatic or manual), may be employed to pull anchor 18 into the appropriate position before the liquid potting compound hardens. Similar devices can be employed to retain the anchors in the appropriate positions throughout the process.

The same process can be applied where a mold is substituted for anchor 18. In other words, a mold can be pulled in place over the strands while they are allowed to set. This mold can then be removed and the strands placed in a separate anchor.

Figure 8:
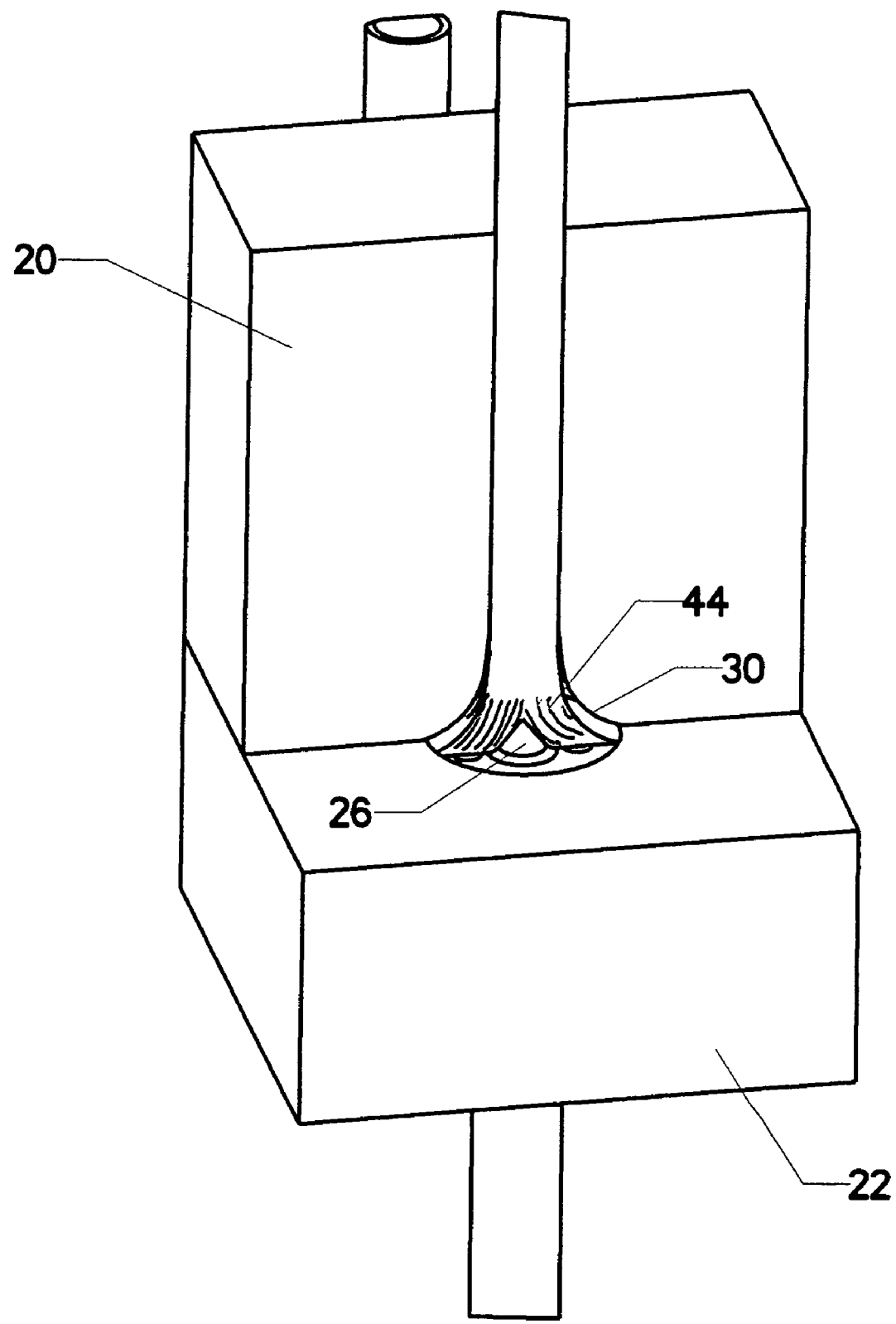
FIG. 8 is an isometric view, showing a cable clamped within a mold.

Those skilled in the art will realize that the internal cavities within the mold components, as well as the infeed runners and vents, can be made in virtually any shape. Multi-cavity molds can also be used to increase the feed rates. Returning to FIG. 1, the reader will appreciate that the mold can be configured to clamp the fibers in any one of the four configurations shown (as well as others). As an example, FIG. 8 shows a mold having a strand cavity 30 shaped to deform the strands into radially fanned strands 44 (The cable is shown sectioned to aid visualization). A separator 26 is also used.

Figure 9:
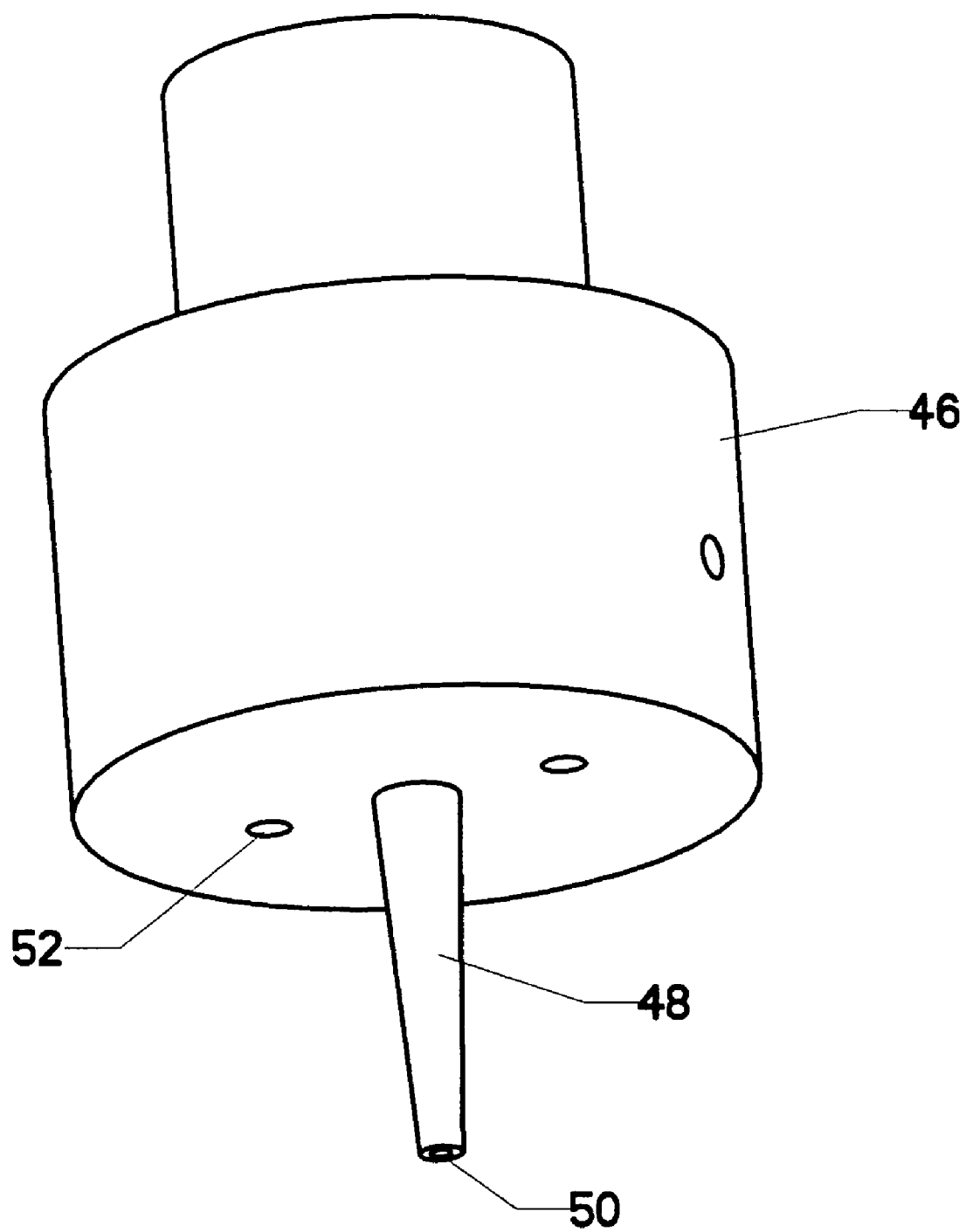
FIG. 9 is an isometric view, showing an injector.
Figure 10:
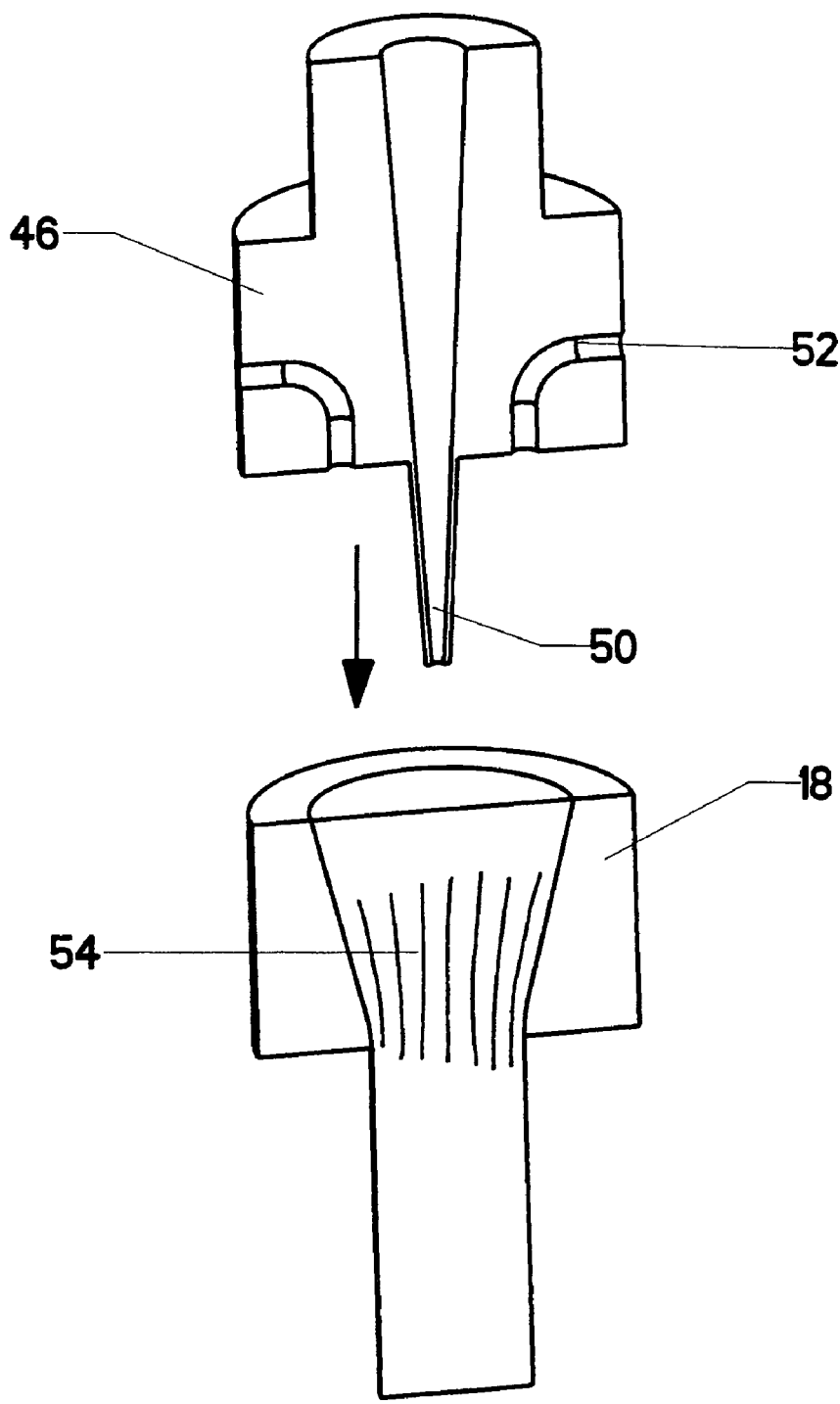
FIG. 10 is an isometric section view, showing the operation of an injector.

The injection process can even be modified to infuse the liquid potting compound from the center of the exposed strands outward. FIG. 9 shows injector 46. Needle 48 extends from its lower surface. Injection orifice 50 passes through needle 48 (The orifice can assume a variety of shapes). The lower surface also opens into a pair of vents 52. FIG. 10 shows injector 46 in a section view. Injection orifice 50 is connected to a supply of liquid potting compound (not shown). Vents 52 can be vented to the surrounding air or collection reservoir. In operation, a mold is placed around the dry exposed strands on the end of a cable. For the example shown, an anchor 18 is actually used as the mold (Split molds such as shown previously could also be used). The anchor has an expanding internal passage which serves as a strand cavity. It also has an open end. Injector 46 is moved toward the exposed strands as indicated.

Figure 11:
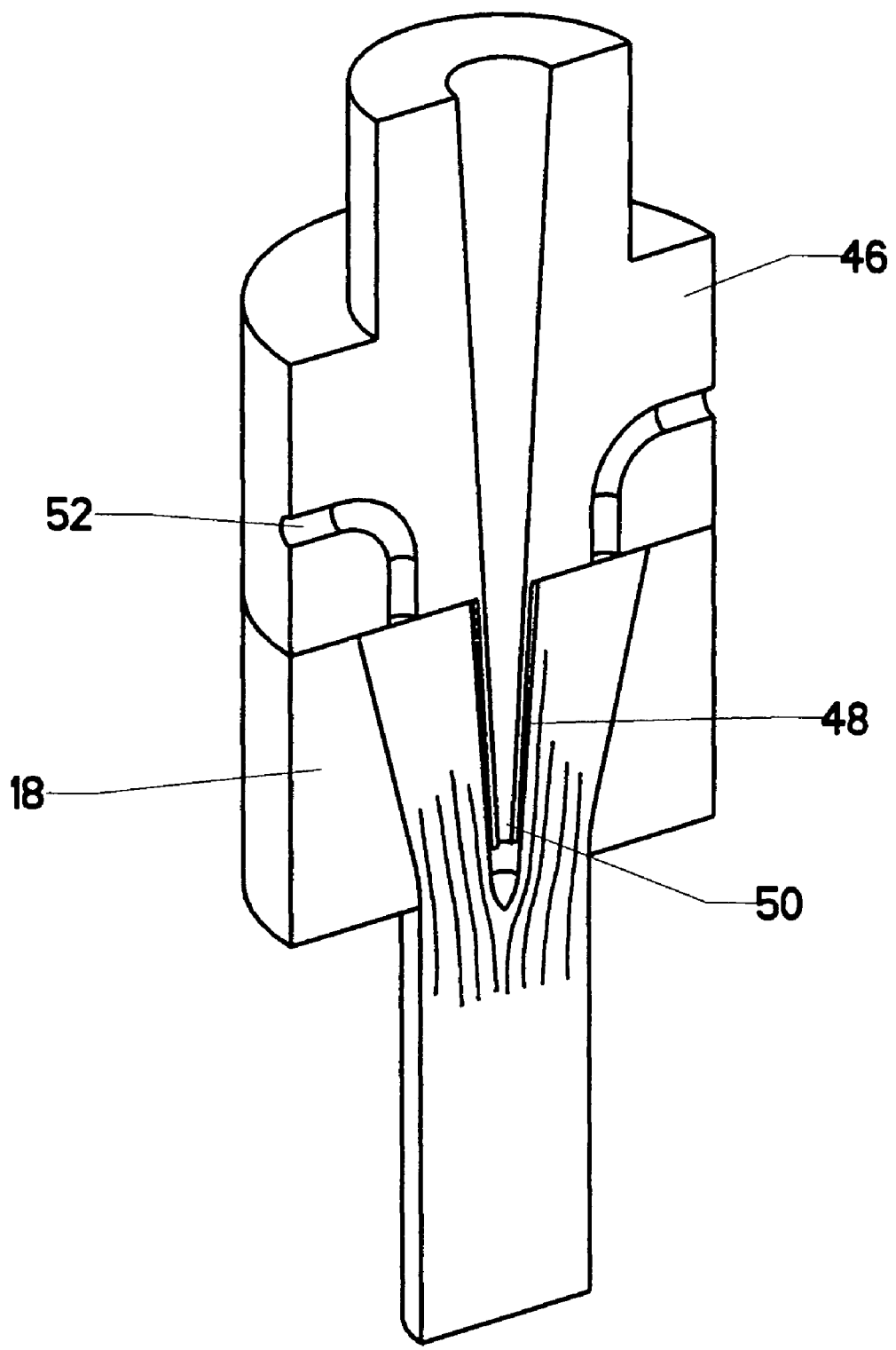
FIG. 11 is an isometric section view, showing the operation of an injector.

FIG. 11 shows injector 46 mated to anchor 18. The lower surface of injector 46 is actually pressed against the upper surface of anchor 18 to form a sealing surface. Needle 48 protrudes down into the exposed strands. Liquid potting compound is then infused through injection orifice 50. It flows out through the strands toward the two vents 52, thereby completely infusing the strands within the anchor's internal passage. Once the infusion is completed, injector 46 is withdrawn. The liquid potting compound then hardens to complete the termination.

Figure 9B:
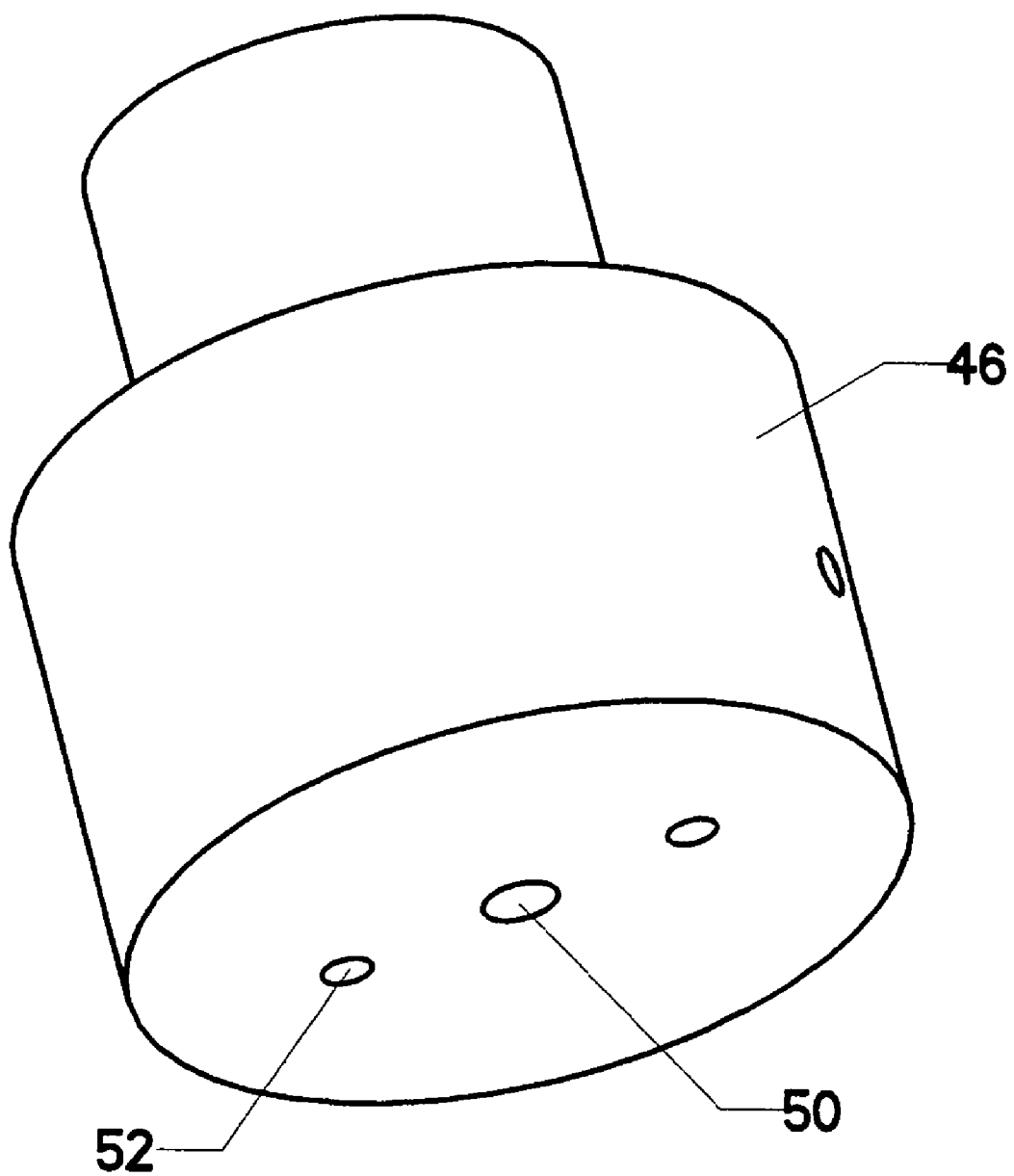
FIG. 9B is an isometric view, showing an alternate injector.

Those skilled in the art will realize that injector 46 can take many forms, including breaking the injector into two or more pieces (like a mold). Needle 48 is optional. The injection could be accomplished via forcing the liquid potting compound through a simple hole. Such an alternate embodiment is shown in FIG. 9B. Likewise, the seal between injector 46 and anchor 18 can be achieved using many methods, including an O-ring or interlocking threads. With the anchor itself forming the mold, it may be advisable to add infeed runners or vents to the anchor. These features could take many shapes. As stated previously, a split mold can be used in the place of anchor 18. In such a case, the anchor would be added after the infusion process is complete.

In performing the potting process whereby the cable strands are locked within the strand cavity, it is important that the cable be aligned with the anchor. The cable has a central axis and the anchor will generally have a central axis as well (assuming that it is a radially symmetric anchor). Any misalignment will result in some of the strands having a shorter overall length than others. When the cable is then placed under tension, the shorter strands will carry a disproportionally large share of the load and the termination will not perform as well as it could. Those familiar with synthetic cables will realize that ensuring the alignment of the cable and the anchor is difficult because synthetic cables have very fine strands and the cables do not tend to be very stiff. Where an older cable such as wire rope will tend to retain its position because of its inherent rigidity, a synthetic cable will deflect substantially under its own weight. Thus, the use of alignment fixturing can be a significant advantage.

Figure 12:
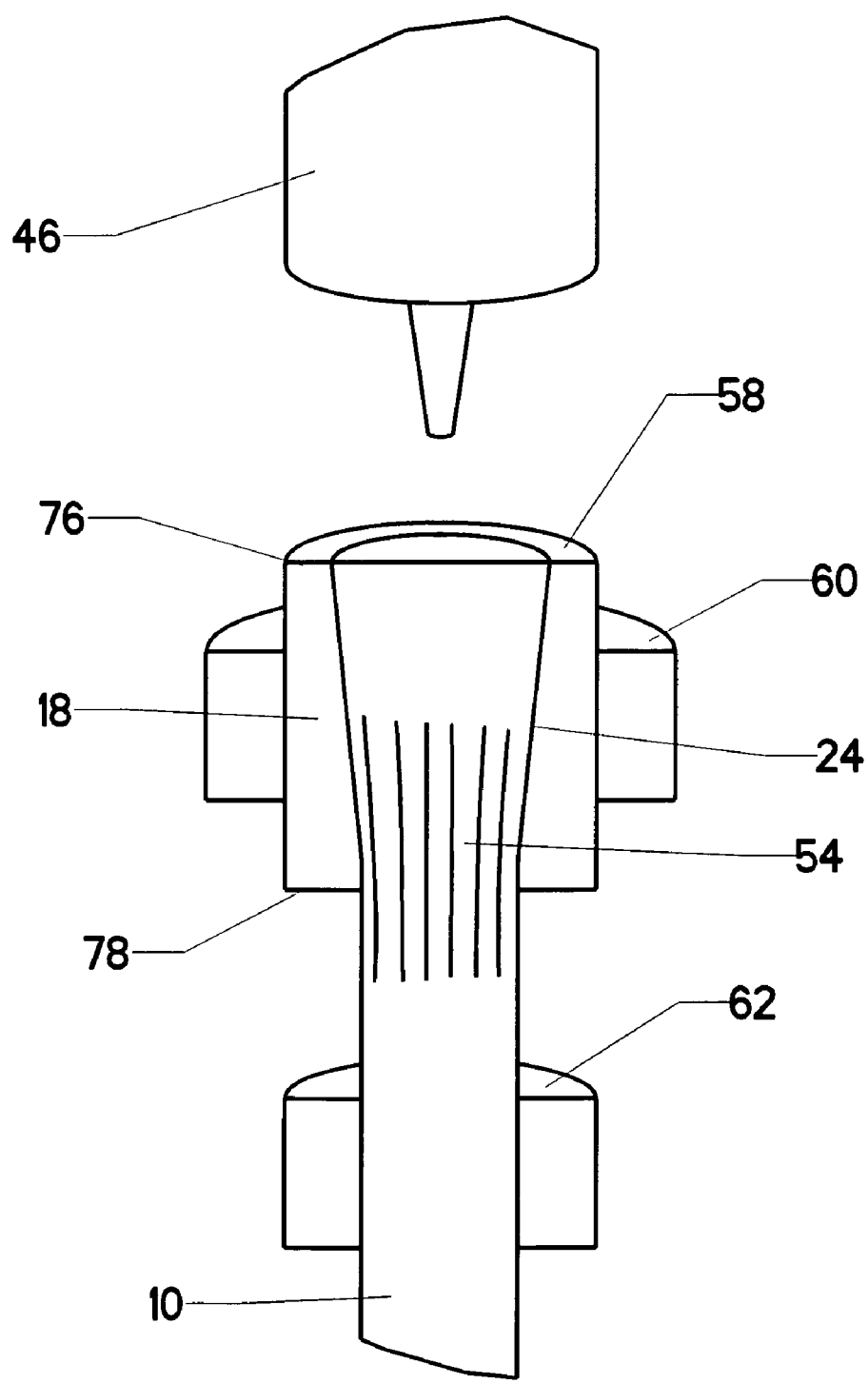
FIG. 12 is an isometric section view, showing the use of a holding fixture on the cable and the anchor.

FIG. 12 shows a solution to the alignment issue. This figure shows a sectioned elevation view through a cable undergoing the potting process. Dry strands 54 on the end of the cable have been placed within strand cavity 24. In this case the strand cavity is actually an expanding passage within anchor 18. Anchor 18 has open end 76 and neck end 78 (The "neck end" being the side where the freely flexing portion of the cable emerges from the anchor through the "neck" of the strand cavity). Strand cavity 24 passes through anchor 18 from neck end 78 to open end 76. The strand cavity preferably has an expanding cross section.

Anchor 18 is placed within anchor holding fixture 60. The anchor holding fixture can assume a virtually limitless variety of forms, but it should hold the anchor securely and keep it in a desired orientation during the process. One example of an anchor holding fixture is a split fixture that is clamped together.

Cable 10 is held in position by cable holding fixture 62. The cable holding fixture is aligned with the anchor holding fixture so that the cable is held in the appropriate position with respect to the anchor. The cable holding fixture can also assume many different forms, with a split collar being one example. It may also be desirable in some applications to employ a lengthened cable holding fixture that grips a substantial length of the cable. Multiple cable holding fixtures can also be used.

Once the cable is properly referenced to the anchor using the two holding fixtures, injector 46 is mated to anchor end sealing surface 58 and the liquid potting compound is infused into the dry strands as described previously. The two holding fixtures are preferably left in position while the potting compound hardens. After the potting compound has hardened, the two holding fixtures are removed. Thus, the holding fixtures ensure alignment until the time when the potting compound has hardened and the cable is secured to the anchor.

The potting compound injection process is best carried out by retaining the liquid compound within the anchor. Unfortunately, some of the liquid potting compound often tends to leak out the neck end of the anchor. This portion will then harden in the cable strands lying outside the anchor, causing localized stress concentrations when the cable flexes, as well as other problems.

Figure 13:
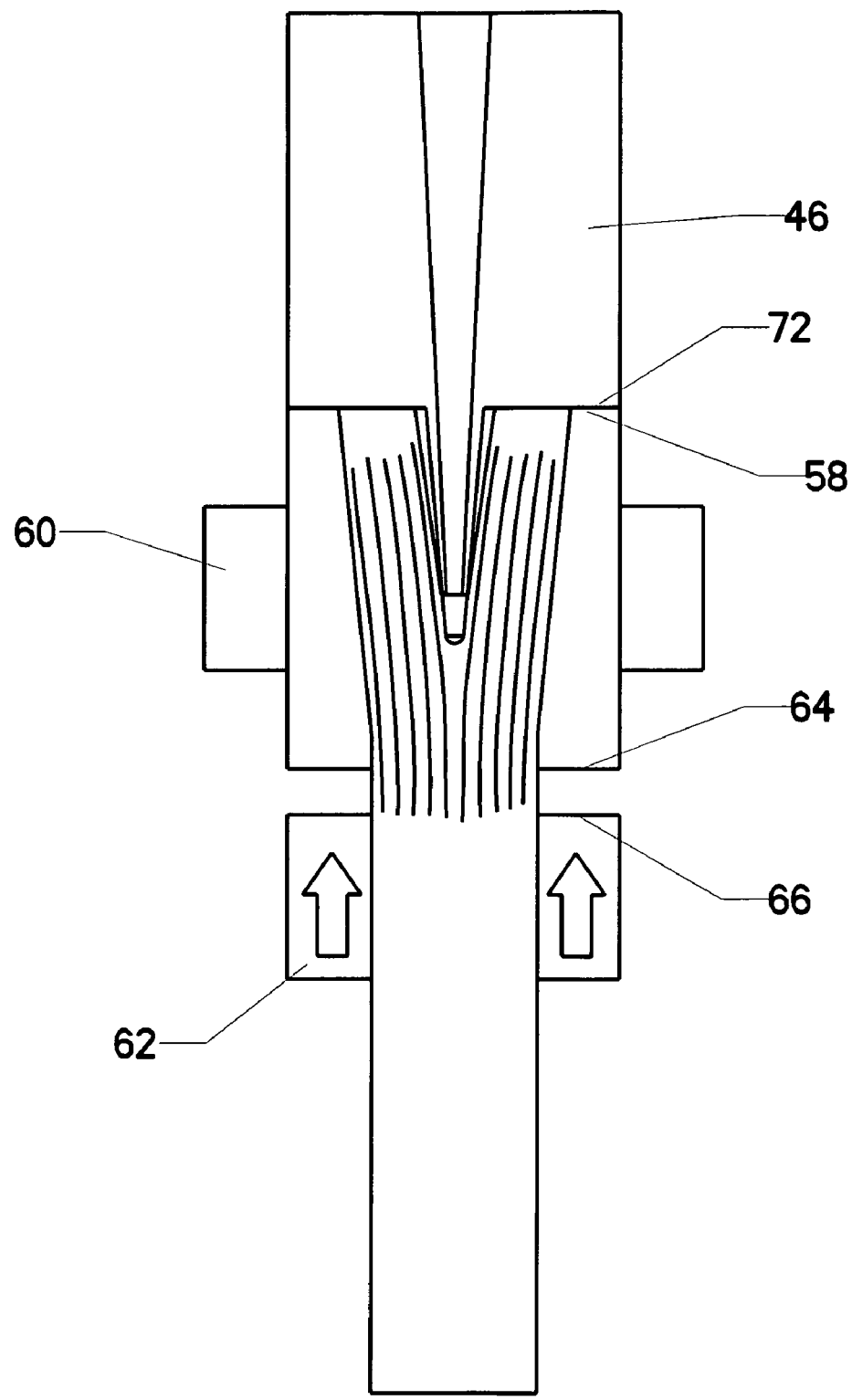
FIG. 13 is a sectional elevation view, showing the operation of the cable holding fixture.

FIG. 13 shows a solution to this problem. The neck end of the anchor is provided with anchor neck sealing surface 64. A fixture sealing surface 66 is clamped against anchor neck sealing surface 64 in order to seal the neck end of the anchor. Fixture sealing surface 64 may be located on a separate component or may actually be provided on cable holding fixture 62.

Injector sealing surface 72 on injector 46 has been mated to anchor end sealing surface on anchor 18—thereby sealing the open end of the anchor. Fixture sealing surface 66 has been mated to anchor neck sealing surface 64 on the neck end of the anchor—thereby sealing the anchor's neck end. The liquid potting compound is then injected by the injector and it floods the strand cavity. The air within the strand cavity is forced out—preferably through the vent or vents in the injector—and replaced with liquid potting compound.

Figure 14:
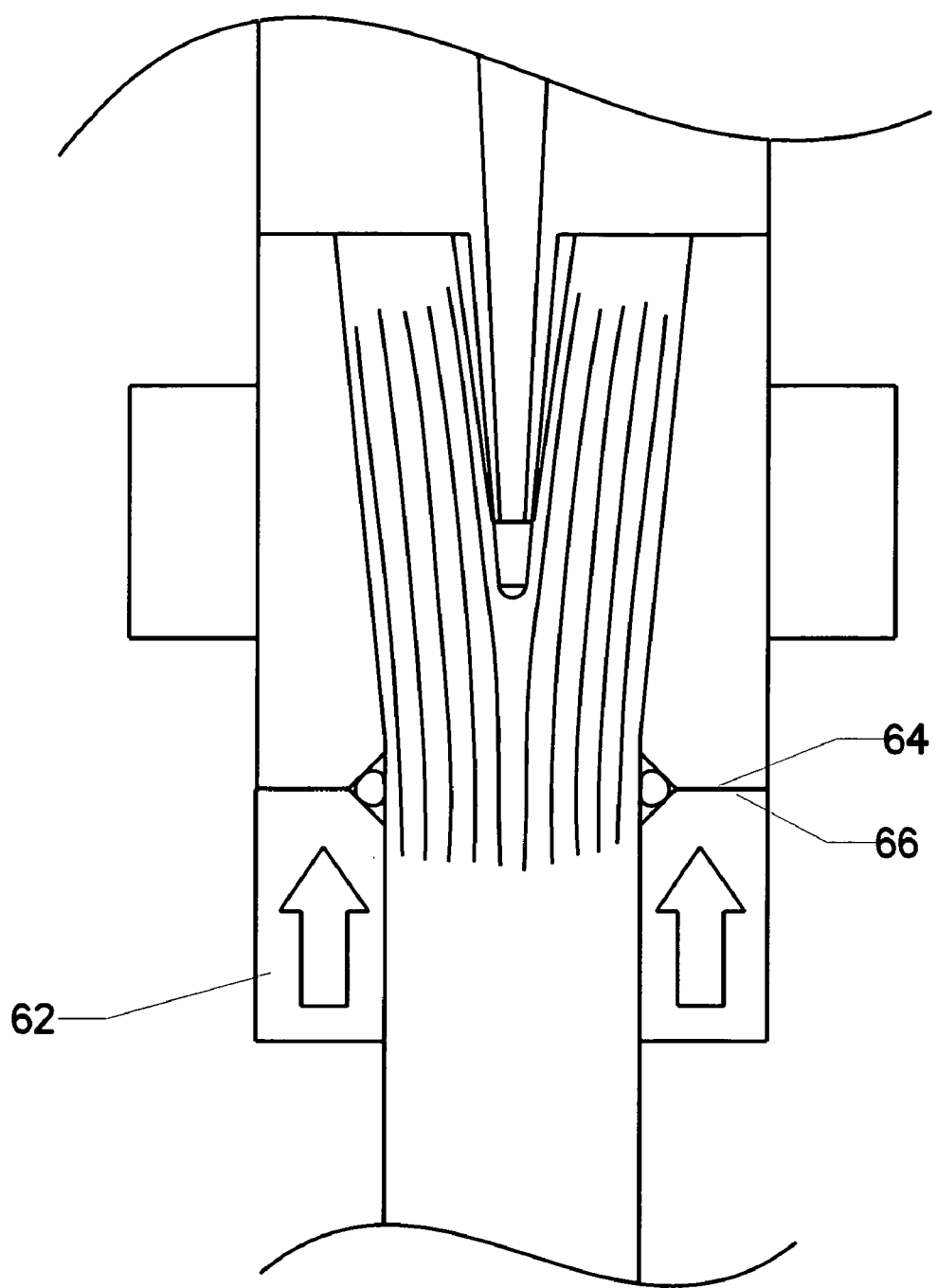
FIG. 14 is a sectional elevation view, showing the use of an O-ring to seal the anchor's lower surface.
Figure 15:
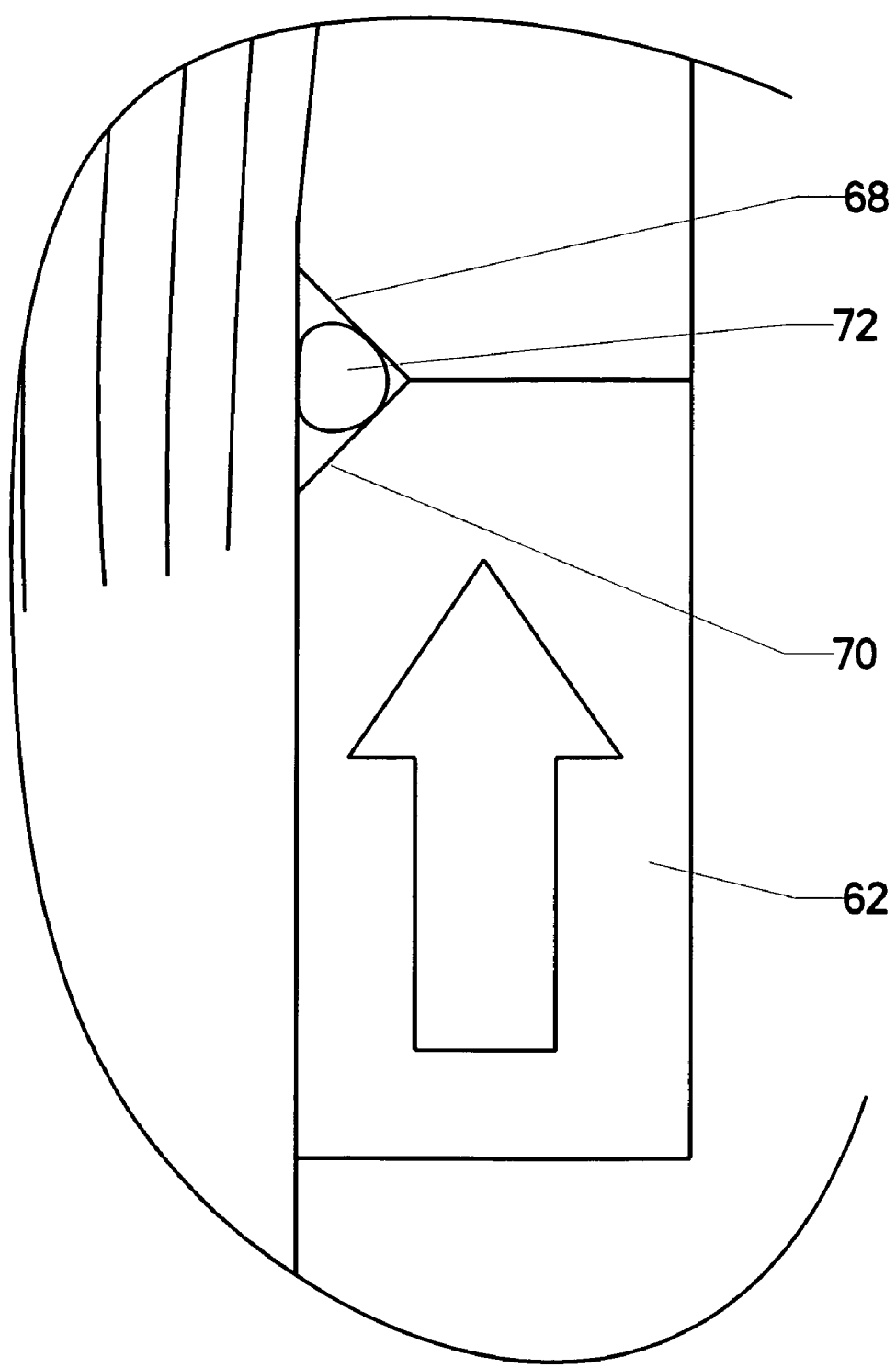
FIG. 15 is a detailed elevation view, showing the O-ring seal in more detail.

FIGS. 14 and 15 illustrate a further refinement. It is preferable to clamp the cable strands in an inward direction near the point where the strands emerge from the neck end of the anchor. This action bunches the strands more tightly together and tends to prevent leakage of the liquid potting compound between the strands. FIG. 14 shows an embodiment in which the neck end of the anchor and the opposing surface on the cable holding fixture are provided with a sealing O-ring.

FIG. 15 shows this configuration in more detail. Anchor chamfer 68 is provided in anchor neck sealing surface 64. An opposing fixture chamfer 70 is provided in fixture sealing surface 66 (which may or may not be part of the cable holding fixture). O-ring 72 is shown in position between the two opposing chamfers. When the anchor neck sealing surface and the fixture sealing surface are pressed toward each other, O-ring 72 is forced inward and upward, suitably compressing the cable strands. Once the potting compound is hardened, the O-ring can be removed or left in place. Although an O-ring having a round cross section is shown, other shapes could be substituted and the term "O-ring" should not be understood to be limited to round cross sections.

Figure 16:
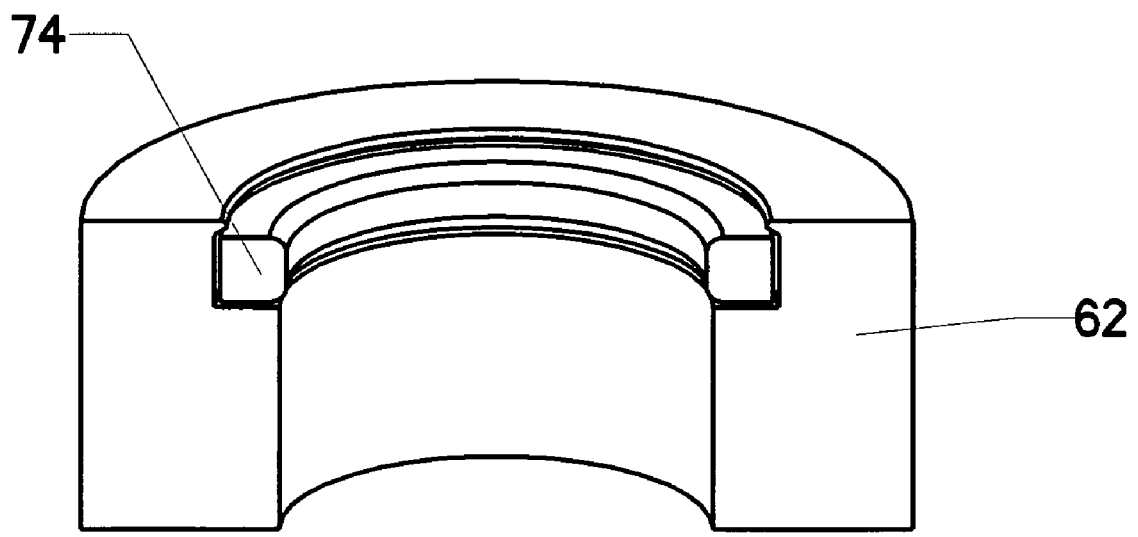
FIG. 16 is an isometric section view, showing the use of an inflatable seal.

Other more sophisticated seals may be used in place of a passive O-ring. FIG. 16 shows another embodiment in which cable holding fixture 62 is equipped with inflatable seal 74. The view shows one-half of a pair of cable holding fixtures which are configured to be clamped around the cable. Gas pressure is then applied to inflate the inflatable seals and seal the cable near the position where it emerges from the neck end of the boundary.

The reader will thereby appreciate how the additional components and steps described can ensure the proper alignment of the cable and the anchor as the potting compound transitions to a solid. The reader will also appreciate how the sealing features and methods help contain the potting compound within the anchor.

Throughout the preceding disclosure, terms referring to the orientation of the parts have been used ("upper", "lower", etc.). Those skilled in the art will realize that the orientation of the components has no significant impact on the operation of the devices. These terms referred only to the orientations shown in the views, and should not be taken as limiting the scope of the invention.

Although the preceding description contains significant detail, it should not be construed as limiting the scope of the invention but rather as providing illustrations of the preferred embodiments of the invention. Thus, the scope of the invention should be fixed solely by the language in the claims that follow.

Having described our invention, we claim:

1. A method for attaching an anchor to a cable, comprising:
   a. providing an anchor having a neck end, an open end, and a strand cavity passing through said anchor from said neck end to said open end;
   b. providing a cable including a plurality of strands and a free end;
   c. placing said plurality of strands of said cable within said strand cavity of said anchor, so that said free end of said cable lies proximate said free end of said anchor, and a remainder of said cable extends out said neck end of said anchor;
   d. providing an anchor holding fixture;
   e. attaching said anchor to said anchor holding fixture;
   f. providing a cable holding fixture;
   g. attaching a portion of said remainder of said cable extending out said neck end of said anchor to said cable holding fixture;
   h. providing an alignment between said cable holding fixture and said anchor holding fixture so that said cable is aligned with said anchor;
   i. providing an anchor sealing surface on said open end of said anchor;
   j. providing an injector, including an injector sealing surface and an injection orifice;
   k. clamping said injector sealing surface against said anchor sealing surface so that said injection orifice is aligned with said strand cavity and said cable strands lying therein;
   l. providing a potting compound which transitions from a liquid state to a solid state over time;
   m. injecting said potting compound, in said liquid state, through said injection orifice and into said strand cavity, so that said liquid potting compound infuses throughout said strand cavity; and
   n. allowing said liquid potting compound to harden into a solid while said cable holding fixture and said anchor holding fixture remain in place, thereby locking said cable within said anchor.

2. A method for attaching an anchor to a cable as recited in claim 1, wherein:
   a. said injector sealing surface includes a needle extending outward therefrom, said needle having a tip distal from said injector sealing surface; and
   b. said injection orifice lies proximate said tip of said needle.

3. A method for attaching an anchor to a cable as recited in claim 1, further comprising providing said injector with a vent.

4. A method for attaching an anchor to a cable as recited in claim 3, further comprising applying a vacuum to said vent.

5. A method for attaching an anchor to a cable as recited in claim 1, further comprising:
   a. providing an anchor neck sealing surface on said neck end of said anchor;
   b. providing a fixture sealing surface; and
   c. placing said fixture sealing surface against said neck sealing surface in order to control the leakage of said potting compound past said neck end of said anchor.

6. A method for attaching an anchor to a cable as recited in claim 5, comprising:
   a. providing said anchor neck sealing surface with a first chamfer along the boundary between said strand cavity and said anchor neck sealing surface;
   b. providing said fixture sealing surface with a second chamfer positioned so that when said fixture sealing surface is clamped against said anchor neck sealing surface, said second chamfer opposes said first chamfer;
   c. providing an O-ring placed around said cable and positioned to that said first and second chamfers clamp said O-ring therebetween when said fixture sealing surface is clamped against said anchor neck sealing surface.

7. A method for attaching an anchor to a cable as recited in claim 5, wherein said fixture sealing surface is located on said cable holding fixture.

8. A method for attaching an anchor to a cable as recited in claim 6, wherein said fixture sealing surface is located on said cable holding fixture.

9. A method for attaching an anchor to a cable as recited in claim 1, further comprising sealing said neck end of said anchor in order to control the flow of said potting compound in said liquid state pas said neck end of said anchor.

10. A method for attaching an anchor to a cable as recited in claim 9, wherein said step of sealing said neck end of said anchor is accomplished using an inflatable seal.

11. A method for attaching an anchor to a cable as recited in claim 9, wherein said step of sealing said neck end of said anchor is accomplished using a pair of opposing chamfers with an O-ring clamped therebetween.

12. A method for attaching an anchor to a cable, comprising:
   a. providing an anchor having a neck end, an open end, and a strand cavity passing through said anchor from said neck end to said open end;
   b. providing a cable including a plurality of strands and a free end;
   c. placing said plurality of strands of said cable within said strand cavity of said anchor, so that said free end of said cable lies proximate said free end of said anchor, and a remainder of said cable extends out said neck end of said anchor;
   d. providing an anchor holding fixture;
   e. attaching said anchor to said anchor holding fixture;
   f. providing a cable holding fixture;

g. attaching a portion of said remainder of said cable extending out said neck end of said anchor to said cable holding fixture;
h. providing an alignment between said cable holding fixture and said anchor holding fixture so that said cable is aligned with said anchor;
i. providing an anchor sealing surface on said open end of said anchor;
j. providing an injector, including
   i. an injector sealing surface,
   ii. a needle, extending from said injector sealing surface, having a first end proximate said injector sealing surface and a second end distal to said injector sealing surface,
   iii. an injection orifice proximate said second end of said needle;
k. clamping said injector sealing surface against said anchor sealing surface so that said needle extends down into said strand cavity and said cable strands lying therein;
l. providing a potting compound which transitions from a liquid state to a solid state over time;
m. injecting said potting compound, in said liquid state, through said injection orifice and into said strand cavity, so that said liquid potting compound infuses throughout said strand cavity;
n. while said potting compound is still in said liquid state, withdrawing said injector from said anchor so that said needle is withdrawn from said strand cavity; and
o. allowing said liquid potting compound to harden into a solid while said cable holding fixture and said anchor holding fixture remain in place, thereby locking said cable within said anchor.

13. A method for attaching an anchor to a cable as recited in claim 12, further comprising providing said injector with a vent.

14. A method for attaching an anchor to a cable as recited in claim 13, further comprising applying a vacuum to said vent.

15. A method for attaching an anchor to a cable as recited in claim 12, further comprising:
a. providing an anchor neck sealing surface on said neck end of said anchor;
b. providing a fixture sealing surface; and
c. placing said fixture sealing surface against said neck sealing surface in order to control the leakage of said potting compound past said neck end of said anchor.

16. A method for attaching an anchor to a cable as recited in claim 15, comprising:
a. providing said anchor neck sealing surface with a first chamfer along the boundary between said strand cavity and said anchor neck sealing surface;
b. providing said fixture sealing surface with a second chamfer positioned so that when said fixture sealing surface is clamped against said anchor neck sealing surface, said second chamfer opposes said first chamfer;
c. providing an O-ring placed around said cable and positioned to that said first and second chamfers clamp said O-ring therebetween when said fixture sealing surface is clamped against said anchor neck sealing surface.

17. A method for attaching an anchor to a cable as recited in claim 15, wherein said fixture sealing surface is located on said cable holding fixture.

18. A method for attaching an anchor to a cable as recited in claim 16, wherein said fixture sealing surface is located on said cable holding fixture.

19. A method for attaching an anchor to a cable as recited in claim 12, further comprising sealing said neck end of said anchor in order to control the flow of said potting compound in said liquid state pas said neck end of said anchor.

20. A method for attaching an anchor to a cable as recited in claim 19, wherein said step of sealing said neck end of said anchor is accomplished using an inflatable seal.

21. A method for attaching an anchor to a cable as recited in claim 19, wherein said step of sealing said neck end of said anchor is accomplished using a pair of opposing chamfers with an O-ring clamped therebetween.

* * * * *